(No Model.)
O. B. PECK.
CENTRIFUGAL SEPARATOR.
No. 560,624.      Patented May 19, 1896.
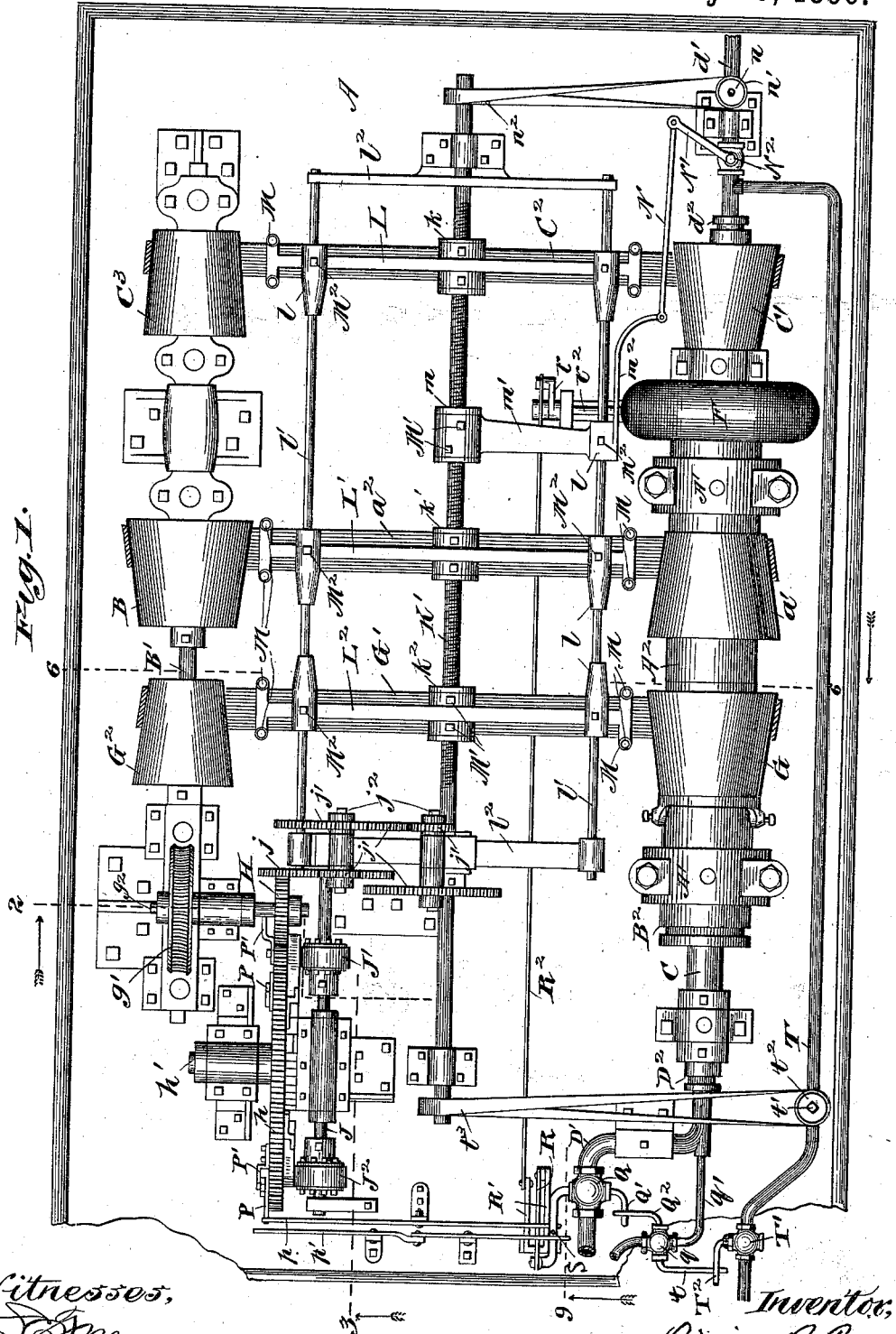

(No Model.) 5 Sheets—Sheet 2.
O. B. PECK.
CENTRIFUGAL SEPARATOR.
No. 560,624. Patented May 19, 1896.
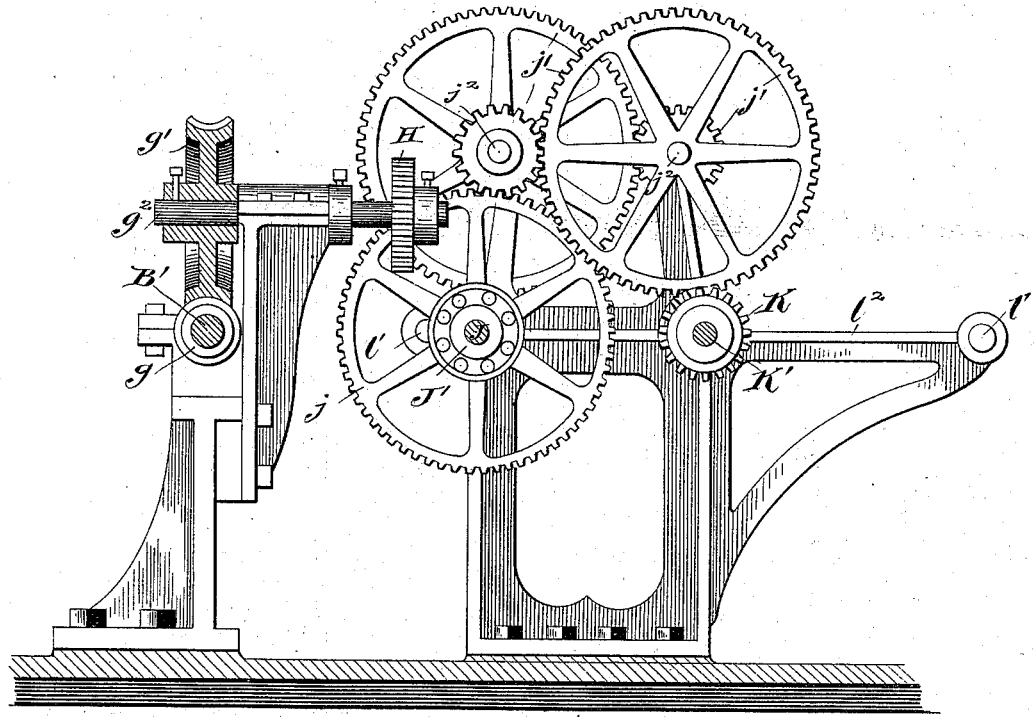
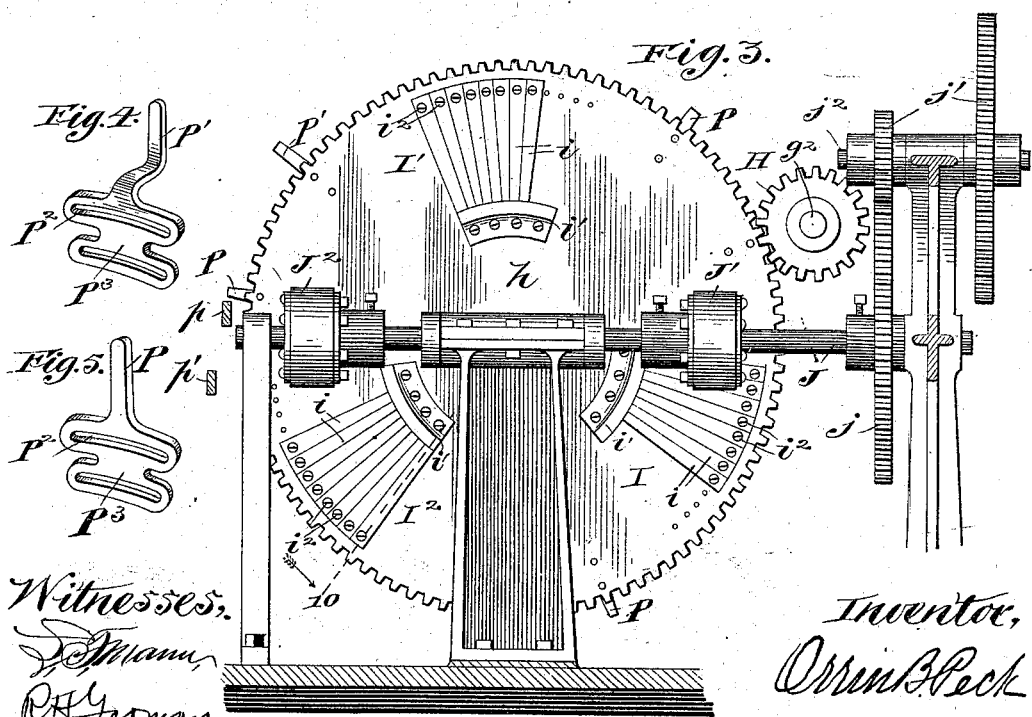
Witnesses,
Inventor,
Orrin B. Peck (No Model.) 5 Sheets—Sheet 3.
O. B. PECK.
CENTRIFUGAL SEPARATOR.
No. 560,624. Patented May 19, 1896.
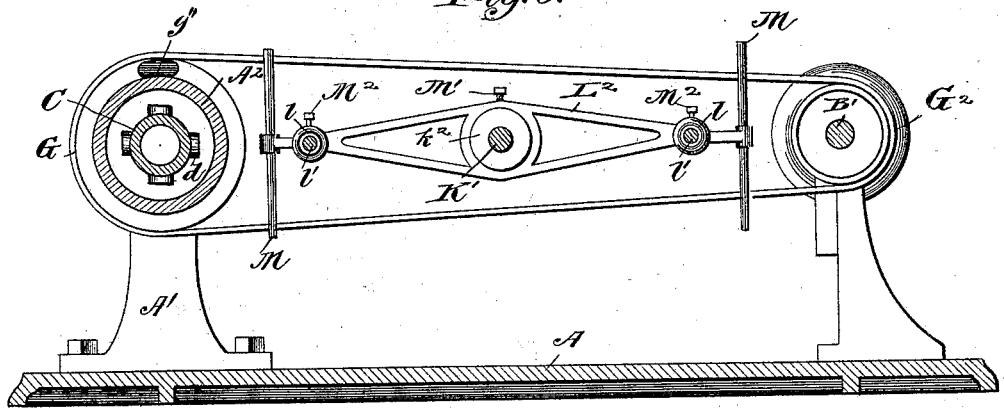
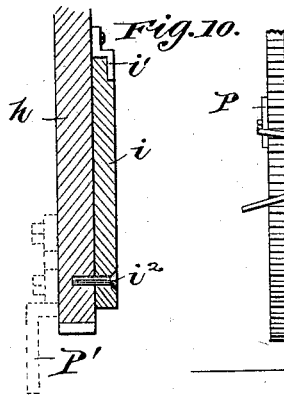
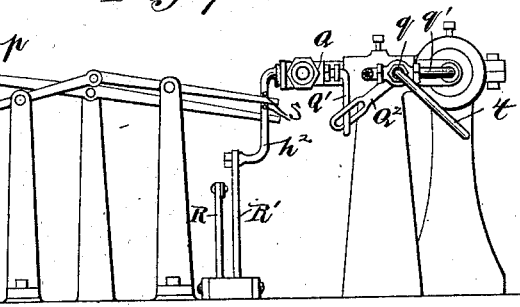
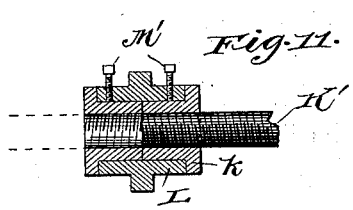
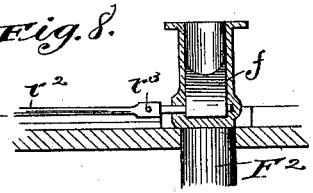
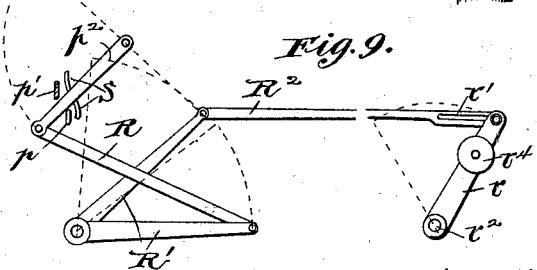
Witnesses,
Inventor,
Orrin B. Peck

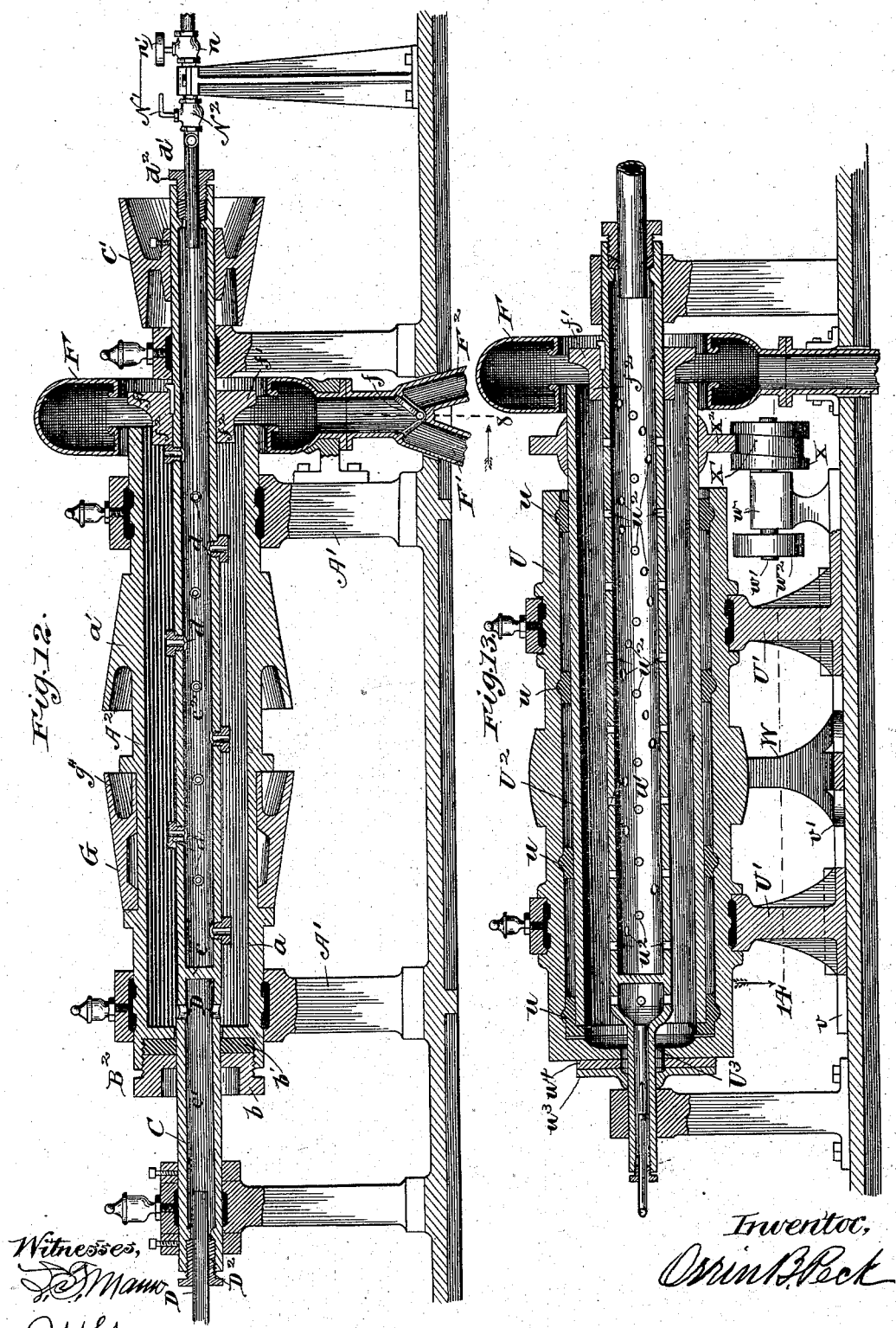

(No Model.)  5 Sheets—Sheet 5.
O. B. PECK.
CENTRIFUGAL SEPARATOR.
No. 560,624.  Patented May 19, 1896.
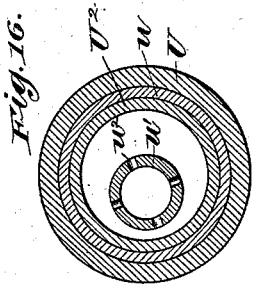
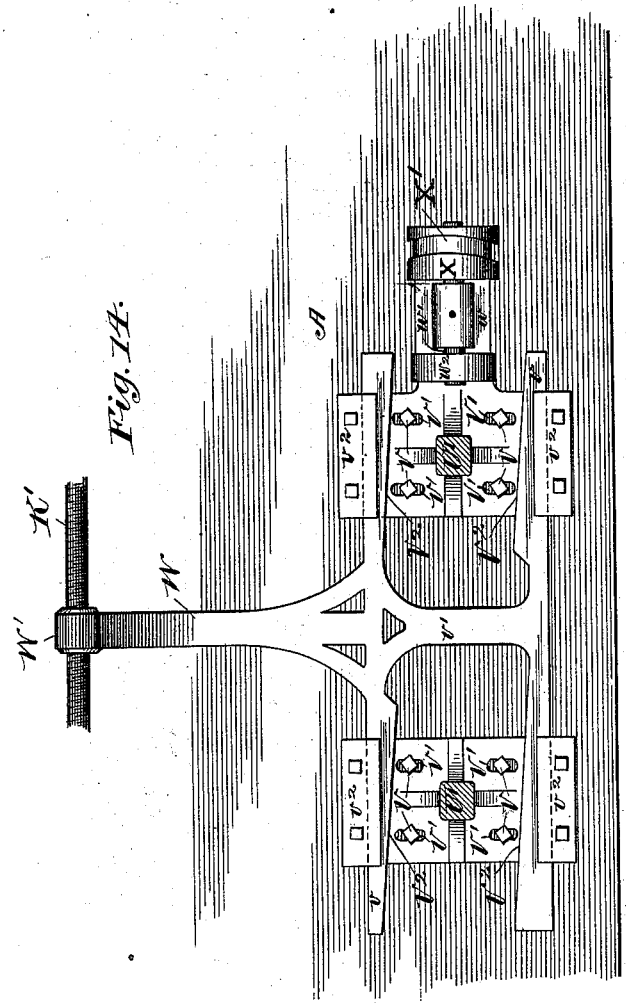
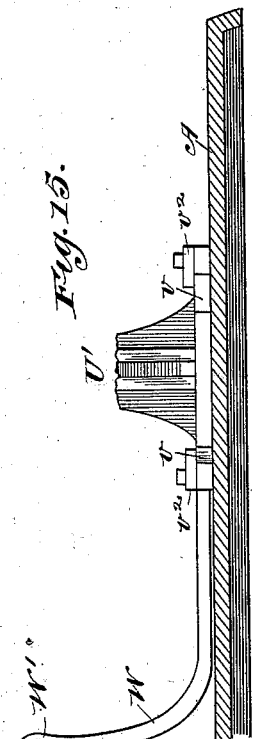
Witnesses,
Inventor,
Orrin B. Peck

UNITED STATES PATENT OFFICE.

ORRIN B. PECK, OF CHICAGO, ILLINOIS, ASSIGNOR TO MELINDA PECK, OF SAME PLACE.

CENTRIFUGAL SEPARATOR.

SPECIFICATION forming part of Letters Patent No. 560,624, dated May 19, 1896.

Application filed March 28, 1894. Serial No. 505,414. (No model.)

*To all whom it may concern:*

Be it known that I, ORRIN B. PECK, a citizen of the United States, residing at Chicago, in the county of Cook and State of Illinois, have invented a new and useful Improvement in Centrifugal Separators, of which the following is a specification.

My invention relates more particularly to improvements in centrifugal ore-separators; and the principal object of my improvement is to provide an apparatus for effecting a more perfect separation of materials of different degrees of specific gravity while in a finely-divided state and their separate discharge by subjecting them, while under the action of centrifugal force, to aqueous forces in the path of rotation of the separating-surface and an independent agitating force. I attain this object by the mechanism illustrated in the accompanying drawings, in which—

Figure 1 is a top plan view of the entire machine. Fig. 2 is a transverse section on the line 2 of Fig. 1. Fig. 3 is a longitudinal section on the line 3 of Fig. 1. Figs. 4 and 5 are perspective views of the striking-fingers P P'. Fig. 6 is a transverse section on the line 6 of Fig. 1. Fig. 7 is an end elevation of the mechanism for actuating the material and liquid feeding valves. Fig. 8 is a transverse section on the line 8 of Fig. 12. Fig. 9 is a longitudinal section on the line 9 of Fig. 1, showing the mechanism for actuating the discharge-valve. Fig. 10 is a sectional detail on the line 10 of Fig. 3. Fig. 11 is a longitudinal sectional detail through the center of one of the belt-shifting bars. Fig. 12 is a central vertical longitudinal section through the treatment vessel. Fig. 13 is a central vertical longitudinal section through the treatment vessel of another form of my improved machine. Fig. 14 is a sectional plan view on the line 14 of Fig. 13. Fig. 15 is an elevation of Fig. 14, looking toward the right. Fig. 16 is a transverse section through the treatment vessel of Fig. 13. All sections are taken in the direction indicated by the arrows.

Similar letters refer to like parts throughout the several views.

A designates a base-plate, on which is supported by standards A' A', in which it is journaled, the treatment vessel $A^2$, preferably of cylindrical form, and provided with an interior separating-surface $a$. This vessel has upon its exterior a conical belt or surface pulley $a'$, by which it is rotated by a belt $a^2$ from the cone-pulley B on the counter-shaft B', preferably journaled in standards on the base-plate and driven from any suitable source of power.

The treatment vessel or separating-cylinder is preferably closed at the feed end by a packing or stuffing box $B^2$, through which passes an inner, preferably hollow, cylinder or shaft C, suitably journaled in standards, and which is rotated by a cone-pulley C', driven by a belt $C^2$ from the cone-pulley $C^3$ on the counter-shaft at a different rate of speed from the outer cylinder, preferably faster, causing the current-generating and impact means carried thereby to travel circumferentially with respect to the separating-surface. This cylinder forms with the separating-cylinder an intermediate channel or passage, but also serves to deflect or guide the material under treatment along near the separating-surface. The stuffing-box $B^2$ is provided with a circular threaded plate or plug $b$, which may be screwed in toward the elastic packing $b'$, compressing it and thus insuring a practically water-tight joint. The inner cylinder is divided by a partition $c$ into two sections $c'$ and $c^2$. The former is supplied with orifices D, through which ore in a finely-divided state and mingled with a liquid, preferably water, introduced by a pipe D', passing through the packing or stuffing box $D^2$, similar to $B^2$, is fed to the treatment vessel, at or near the head end, under sufficient pressure to secure a longitudinal current therethrough in a direction transverse to the path of rotation of the separating-surface. Section $c^2$ is provided with orifices or perforations along over the separating-surface of the treatment vessel, in which are preferably screwed or otherwise secured hollow projections or tubes $d$. These tubes have their diameter enlarged outside the surface of the inner cylinder, forming broad flat cylindrical pins, which by their movements through the material and liquid in the channel or passage generate annular currents over the separating-surface substantially in its path of rotation. The surface friction of the inner cylinder would also aid in this result. Through the tubes $d$ are forced jets of a liquid, preferably water, supplied by a pipe $d'$, passing through a stuffing-box $d^2$. These jets are for the purpose of keeping lighter substances in suspension in the liquid during separation or aiding in moving them toward the point of discharge by their impact against the material and assisting later by their increased impact in dislodging the heavier for removal. The tubes also, in addition to their production of the annular currents, act by their direct contact to mechanically agitate the lighter portion and maintain it in suspension.

The treatment vessel discharges into a hood F, which communicates with branch pipes F' F$^2$, conducting lighter and heavier substances, respectively, to suitable receptacles, the passage from the hood to the pipes being controlled by a valve $f$, which is automatically operated, as hereinafter described. Within the hood, keyed to the inner cylinder, is preferably placed a circular plate $f'$, which deflects the material discharged from the treatment vessel into the hood. This plate preferably has extending a short distance into the vessel a cylindrical portion $f^2$ of smaller diameter, which partially closes the exit therefrom, so that sufficient resistance is offered to the discharge of material and liquid to maintain the channel or passage practically full and keep the material on the separating-surface in a state of submergence, allowing the suspension of the lighter portion.

On the exterior of the treatment vessel, held between a fixed and a movable ring, is mounted the loose cone-pulley G, which is rotated by a belt G' from a pulley G$^2$ on the counter-shaft. This pulley is recessed at its side of largest diameter for a portion of its circumference, as shown at $g''$ in Figs. 6 and 12. This unequal distribution of weight serves to impart in its rotation a vibration to the treatment vessel, assisting in separating lighter from heavier material, and when its speed of rotation is increased, as hereinafter described, also aids in discharging the latter.

To accomplish the separation of material in the treatment vessel and the separate discharge of lighter and heavier substances, the speed of rotation of the separating-cylinder, the inner cylinder in the particular form of mechanism described and illustrated, and the vibrating pulley, the periods of introduction of material and liquid through pipe D' and impact liquid through pipe $d'$, and the operation of the discharge-valve are preferably automatically controlled and periodically or intermittently operated by the mechanism which will now be described. These actions might, however, be otherwise effected manually, if desired.

On the counter-shaft B' is fixed a worm $g$, engaging a worm-wheel $g'$, mounted on a short shaft $g^2$, journaled in a bracket bolted to one of the counter-shaft standards. This shaft carries at its inner end a gear H, which meshes with a large gear $h$ on a stub-shaft $h'$, journaled in a standard on the base-plate. The gear $h$, which rotates at a comparatively slow rate of speed, carries upon its inner surface three sets I I' I$^2$ of small movable friction-plates $i$, which are secured to the face of the gear at their inner ends by flanged brackets $i'$ and at their outer by screws $i^2$, engaging a series of holes. By changing the number and position of these plates the surface of frictional contact may be varied both in length and position. On a shaft J, suitably journaled in a position parallel with the face of the gear $h$, are mounted two friction wheels or rolls J' and J$^2$, adjustably secured thereon by set-screws and alternately engaging with the friction-plates during the rotation of the gear. On the end of shaft J is a gear $j$, which communicates, through a train of speed-up gears $j'$ on the short longitudinal shafts $j^2$, with a gear K, mounted near the end of a longitudinally-extending threaded rod K'. This rod is supported for rotation in standards preferably mounted on the base-plate, and carries along its length internally-threaded sleeves $k$ $k'$ $k^2$, upon which are mounted the transversely-extending belt-shifting bars L L' L$^2$, which are supported at their outer ends by sleeves $l$, sliding freely upon the rods $l'$, supported by the cross-bars $l^2$. Upon the ends of bars L L' L$^2$ are vertical pins M, engaging the opposite sides of the belts which communicate rotation to the treatment vessel, the inner cylinder, and the vibrating pulley. As the gear $h$ is rotated by the intermediate gearing the sets of friction-plates on its surface engage the friction-wheels J' J$^2$, and, through the speed-up gearing, cause the threaded rod to be rapidly rotated alternately in opposite directions with greater or less intermediate periods of rest, thus causing the belt-shifting bars to travel along the rod in accordance with this rotation and move the belts from one end of the cone-pulleys C, $a'$, and G to the other, increasing and decreasing the speed of rotation, with intermediate periods of constant speed. These pulleys are so arranged on their respective cylinders that for an increase of speed of C and G that of $a'$, which is tapered in the opposite direction, is decreased for the reason hereinafter stated.

The threaded sleeves $k$ $k'$ $k^2$ are preferably made in two parts, as shown in Fig. 11, and upon each of these bears a set-screw M', passing through the belt-shifting bar. If it be desired that any one of the belts shall remain stationary in its movement along the surface of its cone-pulley, maintaining the speed of rotation of one or more parts constant, while the others are varied, the set-screws are loosened, thus allowing the sleeves to turn freely in the bars and preventing their travel along the threaded rod. At the same time set-screws M$^2$ in the sleeves $l$ are tightened to engage the rods $l'$, thus insuring the belt-shifting bars remaining stationary. The rod K' also carries another threaded sleeve $m$, upon which is mounted a bar $m'$, extending in one direction only and supported at its outer end by a sleeve $l$ similar to the others. To this bar is secured a rod $m^2$, to which is pivoted a connecting-rod N, pivotally connected at its opposite end to a lever N' on the stem of the clear-liquid or impact valve $N^2$ in the pipe $d'$. The bar $m'$, being caused to travel back and forth by the rotation of the rod K' within its threaded sleeve, causes the valve $N^2$ to be alternately opened and closed by the interposed rods and levers. It may be thrown out of action, if desired, by an arrangement precisely similar to that employed with the belt-shifting bars.

In the pipe $d'$ beyond the valve $N^2$ is preferably another valve $n$ of the straightway type, having upon its outwardly-extending stem a belt wheel or pulley $n'$, which is rotated by means of a belt passing over a pulley $n^2$ near the end of rod K'. The sizes of the pulleys may be so proportioned that during the period that the valve $N^2$ is opened the valve $n'$ will be opened and closed a number of times, imparting a pulsatory action to the jets of liquid issuing from the pipes or tubes $d$, increasing the effect of their impact force.

Upon the opposite surface of the gear $h$ from that which carries the friction-plates are preferably three sets of two adjustable fingers P P', which are secured to the face of the gear by set-screws passing through slots $P^2$ in an enlarged portion $P^3$, the slots permitting an adjustment of the fingers circumferentially of the gear $h$. The finger P' lies in the same plane as its enlarged portion and projects close to the face of the gear, while the finger P' is bent twice nearly at right angles, which causes it to project in a plane at a slight distance from the surface. It has also a greater radial length. These fingers respectively engage the ends of levers $p$ $p'$, the former being a simple lever pivoted at its center upon a standard mounted on the base-plate, while the lever $p'$ is compound, its two sections being mounted upon two similar standards. The opposite ends of these levers contact with the lower and upper sides, respectively, of a lever $p^2$, extending at right angles from the end of the stem of the material-feeding valve Q in the pipe D'. The opposite extremity of the valve-stem carries a lever Q', the lower end of which projects through a slot in the end of a lever $Q^2$, fixed to the stem of the liquid-valve $q$ in the pipe $q'$, communicating with the pipe D' at a point between the valve Q and the treatment vessel.

To the outer extremity of the lever $p^2$ is pivoted a rod R, connected to one member of a bell-crank lever R', pivoted to the base-plate, to the other arm of which is pivotally attached a long connecting-rod $R^2$, leading to the upper extremity of a lever $r$, to which it is attached by a bolt passing through a slot $r'$. The lower end of the lever $r$ is secured to a rod $r^2$, having a socket $r^3$ at its opposite end, in which is secured, by means of a set-screw, the stem of the discharge-valve $f$. By changing the point of attachment of the lever $r$ to the rod $R^2$ and by turning the valve-stem in its socket the extent of movement of the valve $f$ may be adjusted and its relative time of action to the other elements varied. A weight $r^4$ near the upper end of the lever $r$ assists in throwing it in one direction or the other. As the levers $p$ $p'$ are moved downward by the contact of the fingers P P' they respectively raise and lower the lever $p^2$, thus opening and closing the valve Q, with intermediate periods during which it is stationary. The lever $p^2$ carries upon its upper and lower surfaces small pins S, which serve to prevent the slipping of the levers $p$ $p'$ as they engage it. As the valve Q is actuated it also in turn opens and closes the liquid-valve $q$ through the intervention of the levers Q' and $Q^2$. At the same time the discharge-valve $f$ is operated by the bell-crank lever and its connecting-rods and levers.

From the feed end of the treatment vessel extends a pipe T, which opens into the impact-pipe $d'$ between the valve $N^2$ and the inner cylinder, and delivers thereto a liquid, preferably water, from any desired source. The pipe T has a valve T', upon the end of the stem of which is removably secured, by means of a nut, a lever $T^2$, and through a slot in the end of this lever projects a lever $t$ on the end of the stem of valve $q$. These levers are so arranged that the valves will work in unison, and the removability of lever $T^2$ allows T' to be left open and thrown out of operation if desired. Between the valve T and the pipe $d$, and near the former, is a rotatable valve $t'$, similar in all respects to the valve $n$, and operated by a belt extending from its pulley $t^2$ to a pulley $t^3$ near the end of the rod K'. The pulleys may be changed for others of different diameters to secure the number of pulsations desired, or the valve may be thrown out of operation by the removal of its belt.

The pipes D', $d'$, $q'$, and T are connected to elevated reservoirs, pumps, or other sources of supply for securing a suitable head or pressure of material and liquid, and manually-operated valves might be arranged between these sources and the separator to govern the pressure irrespective of the position of the automatic valves.

The operation of the device is as follows: The valve Q being open to its fullest extent, ore in a finely-divided state and mingled with a liquid, preferably water, is fed into the treatment vessel, which is being rotated at a speed sufficient to develop the desired degree of centrifugal force, in sufficient quantities to fill the channel or passage between the inner cylinder and the separating-surface and under such pressure as to create a current through the treatment vessel and over the separating-surface in a longitudinal direction transverse to the path of rotation of said surface. Here the centrifugal force causes the material to move toward a position around the circumference of the vessel and the heavier to lodge upon the separating-surface. The material in suspension in the liquid within the channel and the surface of the accumulated material is also subjected to opposing forces of preferably approximately constant degree, in the form of the vibration of the separating-surface arising from the rotation of the recessed pulley G, the impact of the pulsating jets of liquid issuing from the orifices in the surface of the inner cylinder, the liquid-valve $N^2$ being partially open, and to the direct action of the moving tubes, which causes an agitation in the material, permitting the heavier portion to be precipitated and causing the lighter to be partially or wholly suspended in the liquid and moved along toward the outlet by the transverse current, where it is conveyed by a pipe F' to a suitable receptacle. At the same time annular currents in the liquid are created by the movement of the broad pins therethrough. These currents tend to cause the lighter material to move in the path of rotation of the separating-surface, starting it in motion, thus requiring a less rapid transverse flow and therefore a less quantity of liquid to accomplish the same result. If there were only the transverse flow, it would require a considerable velocity to move material from the initial point to which it is carried by centrifugal force, and, once started, it would pass through the cylinder too quickly to be properly separated. These annular currents also serve to distribute the material more uniformly over the separating-surface. It will not be found necessary under all conditions, however, to employ all of the above-mentioned opposing forces, and they may be used separately or conjointly and of a greater or less degree of intensity as may best be adapted to the conditions or material under consideration. It is preferable, however, to use at least one agitating force which is independent of the mechanism for producing the annular currents—such as liquid jets, vibrating devices, or separate agitators—to enable the degree of agitation to be adjusted for the various conditions under which it may be desired to operate the separator without regard to the force exerted by said currents. It will be understood that the more violent the agitation with relation to the centrifugal force during the separating period the heavier will be the portion of material discharged during such period, and vice versa. The separation being accomplished, the valves and gearing are in the position shown in the drawings, and heavy material is now to be automatically discharged. The group I of friction-plates in its upward movement, as shown in Fig. 3, engages the friction-wheel J' and causes it to rotate, through the intermediate gearing, the longitudinal threaded rod, thus moving the threaded sleeves and the bars which they support, shifting the belts to the opposite ends of the cone-pulleys, and opening wide the impact-valve $N^2$. At the same time the finger P strikes the end of lever $p$, which, by means of the system of levers already described, closes the material-valve Q, opens the clear-liquid valve $q$, and shifts the position of the discharge-valve $f$. As a result of these changes the supply of material is shut off from the treatment vessel and the speed of rotation of such vessel is decreased, causing the heavier substances to be held less forcibly against the separating-surface and permitting them to be dislodged by the increased impact and the increased vibration. At the same time the transverse current is so intensified by the maximum supply of liquid through pipes $q'$ $d'$ that the retarding effect of the annular currents is overcome, they now serving rather to disturb or agitate the material, and heavier substances are washed from the separating-surface out of the treatment vessel and discharged from the pipe $F^2$, which conveys them to a separate receptacle. This position of parts and constant degree of forces for discharge are maintained until the group I' of friction-plates in its downward movement engages the friction-roll $J^2$, causing the opposite rotation of the rod K', which with the striking of the finger P' against the lever $p'$ restores the elements to their former condition, and the period of separation follows. The pipe T admits of increased aqueous forces being obtained to remove heavier substances by putting into operation the valve T', it being open when valves $q$ and $N^2$ are open, obtaining an increased flow of liquid in pipe $d'$, and thus a greater impact and current from the jet-pipes; or, the belt of valve $t'$ being put on and the lever of valve T' disconnected, an increased pulsatory force in pipe $d'$, and therefore greater agitation by the jets, will be obtained during both the periods of separation and removal, but particularly the former, when the action of the other pulsating valve is partly shut off. By the use of the two sets of valves all degrees of intensity of aqueous force may be obtained, and, if desired, either may be used independently of the other.

When a separating vessel or cylinder is used of sufficiently large diameter to permit an accumulation or head of liquid at the feed end to secure by the centrifugal force generated therein the desired force of flow through the same, the packing-boxes are preferably dispensed with.

By means of the adjustments and changes in the various parts of the mechanism the length and frequency of the periods of operation of the elements, the intensity of the applied forces, and their relation one to the other may be varied within the desired limits.

The adjustment of the contact-surfaces I I' $I^2$ and the friction-wheels engaging therewith furnish a means for changing the intensity and time of application of the centrifugal force, annular currents, agitation, and vibration collectively to vary the periods of separation and removal. If, for example, it is desired to gradually change the speed of rotation of the separating-surface, inner cylinder, and vibrating pulley during the period of separation—say an increase thereof, and then almost immediately decrease them to the initial point during the period of removal of heavier substances—the contact-surfaces may be sufficiently increased by adding the removable plates and the friction-wheels moved well in toward the center of the gear $h$. As a result one of the wheels will be in frictional engagement with the contact-surfaces a greater part of the time, actuating the belt-shifters almost continuously alternately in opposite directions, effecting the desired change. Or if it is desired to maintain the speed of rotation of these parts approximately constant during the period of separation and removal, but of different rates, plates are removed from each of the contact-surfaces and the friction-wheels moved toward the periphery of the gear, giving substantially the arrangement illustrated in the drawings and already described. By setting any one of the belt-shifting bars along the threaded rod the timing of the movement of the parts it actuates will be changed with respect to its fellows. The rotation of any one pulley may be maintained constant by throwing out of action and fixing its belt-shifting bar; or any of the pairs of pulleys may be removed and others of different size substituted, or the pulleys reversed in position on the shaft, thus making the change in its speed of rotation opposite to the others. The setting of the bar $m'$ on the rod $k'$ adjusts the period of action of the impact-valve, and by putting pulleys of different diameters in place of those on the rod and on the stems of valves N and $t$ the speed of rotation of said valves, and consequently the number of pulsations of impact-jets of liquid delivered upon the separating-surface, may be varied as desired, increasing or decreasing their agitating effect. The circumferential adjustment of the fingers P P' controls the relative time of feed of material and discharging liquid, while the time and extent of movement of the discharge-valve may be independently adjusted by the point at which its lever is attached to the connecting-rod and the movement of its valve-stem in the connecting-socket. The intensity of the transverse current will be controlled by the position of the material and liquid valves, while that of the annular current depends on the relative speed of rotation of the inner and outer cylinder.

In the form illustrated in Figs. 13 to 16, inclusive, another means is shown for varying the intensity of the annular currents. An outer rotatable supporting-frame U, preferably of cylindrical form, journaled in standards U' U', has supported within it a light vibratable intermediate or separating cylinder $U^2$ by means of interposed elastic rings $u$. These rings hold the cylinders together with sufficient force to cause the inner to rotate with the outer at approximately the same speed, yet permitting the longitudinal vibratory reciprocation of the former hereinafter described. The inner cylinder $u'$ is similar to that already described, except that it is fixed non-rotatably in its supporting-standards and has no current-generating pins about its impact-orifices $u^2$. It extends through a transverse slot $U^3$ in the head of the supporting-cylinder and has secured about it, just outside the head, a plate $u^3$, bearing firmly against a plate $u^4$ thereon. These plates are faced off and trued, and their contact insures a practically water-tight joint at this end of the treatment vessel. The standards U' U' are movably mounted upon the base-plate, being permitted to travel only in a path transverse of the axis of the treatment vessel by bolts V, screwed into the base-plate and passing through the elongated transverse slots V' in the feet of the standard. The sides of these feet are inclined, as shown at $V^2$, and are engaged by wedges $v$, mounted upon and preferably integral with a frame $v'$ and moving between guides $v^2$, secured to the base-plate. This frame has an upwardly and outwardly extending arm W, having at its outer extremity an internally-threaded collar W', which embraces the longitudinal threaded rod K'. As this rod is rotated alternately in opposite directions, as already described, the wedge will be moved longitudinally back and forth, forcing the standards to be reciprocated transversely, and thus causing the separating-surface which they support to approach and retreat from the inner cylinder. On one of the standards U' is supported a bracket $w$, in which is journaled a short shaft $w'$, having at one end a pulley $w^2$, by which it is rotated, and at the other a wheel X, having in its outer periphery a cam-groove X'. Into this groove extends a flange $X^2$ upon a ring encircling the end of the separating-cylinder, which extends beyond the end of the supporting-cylinder. The rapid reciprocation which is the result of the rotation of this cam-wheel imparts to the separating-surface a vibration as it is reciprocated through the elastic rings. The ring $u$ at the feed end has an annular groove into which the separating-cylinder extends, forming a practically water-tight joint and preventing the passage of material and liquid between it and the supporting-cylinder. The belts driving the supporting-cylinder and vibrating cam would be supplied with automatic tighteners to maintain the proper tension during the movement of these parts. In this modification the intensity of action of annular currents would be least when the surface of the inner cylinder is concentric with the separating-surface and the body of the liquid in the channel is being carried freely around with the latter by its rotation. Then as the rotation of rod K causes the separating-surface through its supporting parts to approach the inner cylinder the passage through which the body of liquid must pass in its rotation is narrowed, checking its flow and permitting the separating-surface to slip or travel under it, and consequently increasing the intensity of the force of the annular current. The former condition will be during the period of separation, the annular current being strong enough to start the lighter material moving in the cylinder to allow its discharge by the transverse current. Then for the removal of heavier substances the increase of the annular current acts with other forces as an agitating means, while the greater proportional increase of the transverse current, as in the form already described, accomplishes the discharge.

The mechanism for automatically actuating the feed, impact, and discharge valves and varying the applied forces by different speeds of rotation, already described in connection with the other figures, may be likewise employed here, and has therefore not been shown or described.

The phrases "aqueous forces," "aqueous currents," and the like have been used for the sake of conciseness, although it is not intended to limit the liquid used to water.

Although the terms "cylindrical" and "cylinder" have been applied throughout to the three portions of the treatment vessel, for the sake of brevity, this form is not absolutely essential to the operation of the machine, and any other might be employed by which the desired result would be obtained. It is to be understood that the words are used in their generic sense in both description and claims. It will be noticed that while the aqueous and other forces opposing centrifugal force permit or allow the precipitation of heavier substances they cause or effect—that is, compel—the suspension of the lighter in the liquid, whereas the centrifugal force acts positively to effect both results. This explanation is made because it was not always possible to bring out the distinction clearly in the claims without undue prolixity when mentioning these forces in connection.

It is obvious that many changes and modifications in the details of construction of the various parts of the mechanism herein described may be made as desired by the constructor, or to best show the varied conditions under which the machine is operated, without departing from the spirit of my invention.

In my applications Serial Nos. 505,410, 505,413, and 505,418, filed March 28, 1894, I claim certain features shown and described but not claimed herein.

What I claim as my invention, and desire to secure by Letters Patent, is—

1. In a centrifugal separator, the combination of a rotatable separating-surface, a hollow shaft or cylinder in proximity thereto for securing aqueous currents over said surface in its path of rotation by the relative movements of the two, orifices in the shaft for delivering jets of liquid over the separating-surface, and means for varying the force of the jets independently of the movements of the shaft and separating-surface, substantially as described.

2. In a centrifugal separator, the combination of a rotatable separating-surface, a hollow shaft or cylinder in proximity thereto for securing aqueous currents over said surface in its path of rotation by the relative movements of the two, orifices in the shaft for delivering jets of liquid over the separating-surface, and automatic means for varying the force of the jets independently of the movements of the shaft and separating-surface, substantially as described.

3. In a centrifugal separator, the combination of two or more cylinders, one within the other, forming an intermediate channel or passage adapted to be filled with liquid in operation, and means for varying the relative positions of the axes of said cylinders, whereby annular currents of different intensity are produced, substantially as described.

4. In a centrifugal separator, the combination of two or more cylinders, one within the other, forming an intermediate channel or passage, adapted to be filled with liquid in operation, and automatic means for varying the relative positions of the axes of said cylinders, whereby annular currents of different intensity are produced, substantially as described.

5. In a centrifugal separator, the combination with a rotatable separating-surface, of an inner cylinder or shaft, capable of being placed concentric with or eccentric to such separating-surface, and means for varying such eccentricity, substantially as described.

6. In a centrifugal separator, the combination with a rotatable separating-surface, of an inner cylinder or shaft capable of being placed concentric with or eccentric to such separating-surface, and automatic means for varying such eccentricity, substantially as described.

7. In a centrifugal separator, the combination of an axially-movable, rotatable treatment vessel, a shaft or cylinder therein, and means for moving said treatment vessel toward and from the shaft or cylinder, substantially as described.

8. In a centrifugal separator, the combination with a rotatable treatment vessel of a shaft or cylinder therein, the former being movable, movable supports for the same, and means for reciprocating said supports, substantially as described.

9. In a centrifugal separator, the combination of a rotatable treatment vessel, movable supports for the same, and means for vibrating said vessel mounted on one of said supports, substantially as described.

ORRIN B. PECK.

Witnesses:
M. L. ALLEN,
R. H. GARMAN.